UNITED STATES PATENT OFFICE.

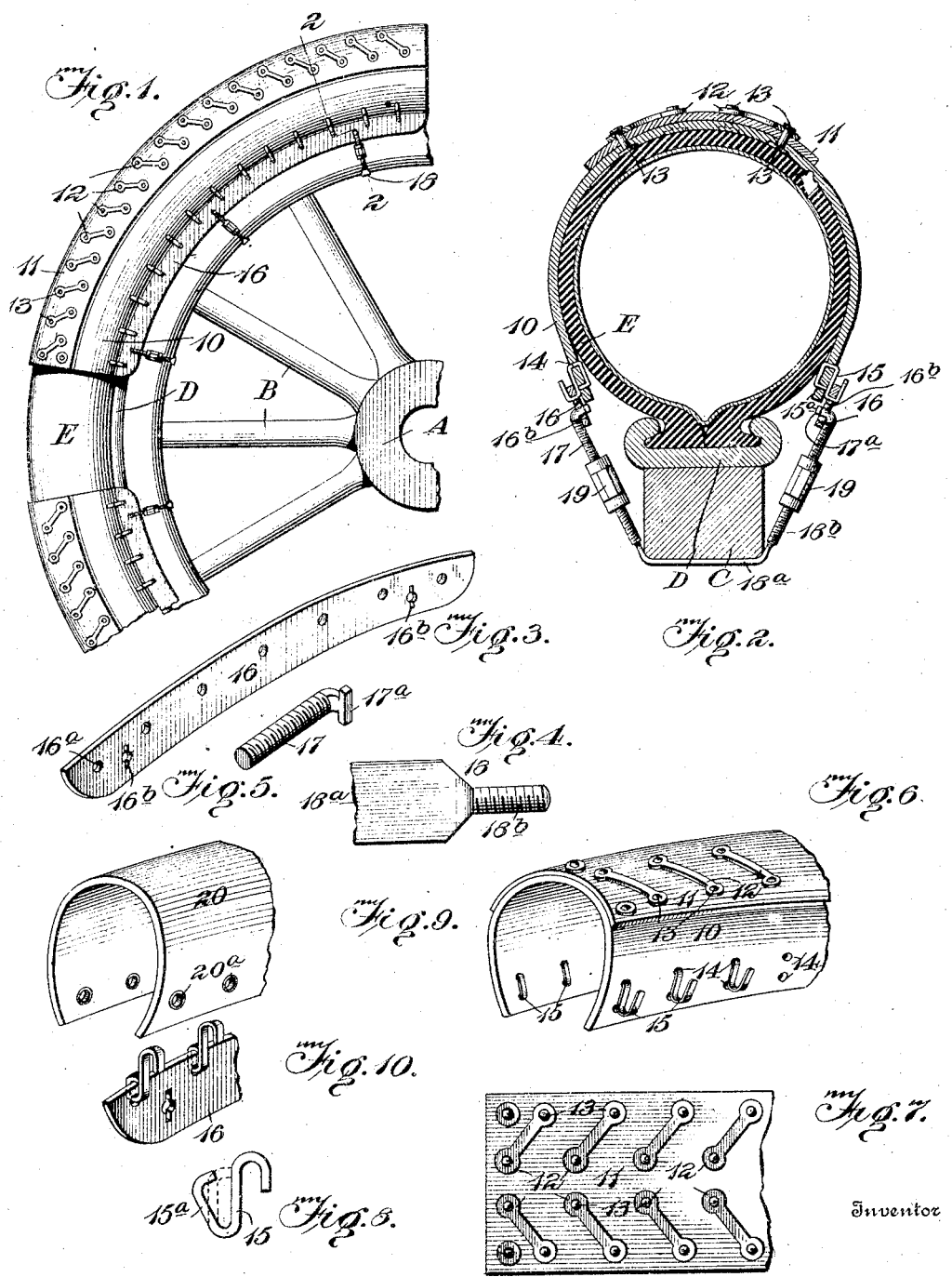

SAMUEL C. WOLFE, OF ANGOLA, INDIANA.

TIRE-PROTECTOR.

No. 854,137.  Specification of Letters Patent.  Patented May 21, 1907.

Application filed March 1, 1907. Serial No. 360,033.

*To all whom it may concern:*

Be it known that I, SAMUEL C. WOLFE, a citizen of the United States, residing at Angola, in the county of Steuben and State of Indiana, have invented certain new and useful Improvements in Tire-Protectors, of which the following is a specification.

This invention relates to the art of making resilient tires for vehicles, and has particular reference to the provision of means whereby the efficiency and durability of such tires are increased, and also aims to provide a means for convenient repair of such tires in the event of punctures, blowouts, and the like, when on the road.

Another object contemplated by this invention is the provision of an armored sleeve adapted to be secured to a vehicle wheel or tire to prevent slipping and skidding thereof.

For a full understanding of this invention, reference is to be had to the accompanying drawings, whereon like parts are indicated by similar reference characters, and in which Figure 1 is a fragmentary view of a vehicle wheel of any usual or approved construction and with the improved protector applied to the tire thereof; Fig. 2 is an enlarged cross sectional view taken substantially on the broken line 2—2 of Fig. 1, and showing the protector applied; Figs. 3—4—5 are detail views of the securing plate, felly clip, and securing bolt, respectively; Fig. 6 is a perspective view of the protector sleeve; Fig. 7 is a face view of the tread of the protector; Fig. 8 is a detail view of the draft hook showing in full lines its form before being applied and in dotted lines the same after being applied; Fig. 9 is a fragmentary perspective view of a sleeve provided with eyelets, and Fig. 10 is a fragmentary view of the securing plate fitted with draft hooks and adapted to be used in connection with the form of sleeve illustrated in Fig. 9.

The vehicle wheel hub A, spokes B, felly D, and tire E are or may be of any usual or approved construction, and *per se* form no part of this present invention. The protector sleeve 10 is made of any suitable strong and tough yet flexible material, and is preferably provided with a re-inforcement strip 11 secured thereto in any suitable manner, in this instance by means of rivets. In order to strengthen the structure in use, to protect the same from usage over rough roads, and to prevent the wheel from slipping and the vehicle from skidding, the protector sleeve is provided with armored plates 12 shown as secured by rivets 13 and which constitute an effective means for securing the re-inforcement strip to the main part of the sleeve. The said plates and rivets also constitute effective means to prevent slipping and skidding of the wheel to which the protector is applied. The sleeve 10 is provided along its margins with series of double holes 14 and which may be formed therein by any suitable means according to the structure or composition of the sleeve. In each pair of the holes 14 is placed a double ended draft hook 15 of peculiar form shown in Fig. 8, and when in its applied position is securely locked to the sleeve in such a manner that the draft on the hook comes squarely against the structure of the sleeve at two points whereby the effectiveness of the appliance is greatly enhanced, the short end $15^a$ of the hook coming against the shank of the hook.

A strong securing plate 16, of any suitable material, preferably of metal, is provided for each edge of each section of the protector sleeve. This plate is provided with a series of holes $16^a$ along one edge, and spaced to correspond with the spaces between the pairs of holes 14. Each plate is also provided along its opposite edge with a plurality of slot holes $16^b$, and in which securing bolts 17 are adapted to be inserted, the T-head $17^a$ of each bolt 17 being first passed through its slot hole with the bolt lying substantially parallel with the plate and subsequently turning the bolt through an angle of 90 degrees. When in this position the T-head prevents any possibility of the bolt becoming detached from the plate. A yoke or clip 18 embraces the inner face of the felly and is provided with an intermediate flattened portion $18^a$ and with threaded ends $18^b$. The threads of the bolts 17 and clip ends $18^b$ are of opposite character, the one being left handed and the other right handed and as a convenient means for securing these parts together adjustably there are shown turnbuckles 19 provided also with right and left handed threads. It will of course be understood that the length of the plates 16 and the number of yokes employed therewith will be dependent upon the desire of the user or the exigencies of each particular case. A single yoke and one pair of bolts 17 might be employed in some instances if desired.

The hooks 15 may be carried applied to the sleeve if desired, or they may be applied thereto when needed. Whenever it is found necessary or desirable to equip the vehicle tire either with a single short section, a long section, or even with a complete covering of the improved protector, the sleeve portion of the protector is applied and with the hooks secured thereto, when the plates 16 are hooked upon the aforesaid hooks 15, the plates 16 being curved as will be obvious to conform to the curvature of the wheel rim. Bolts 17 are then inserted in the slot holes 16$^b$ of the plates on opposite sides of the wheel, the yokes 18 applied to the felly and each of which will be secured to a pair of bolts 17 by means of turnbuckles 19 and with as much tension as may be found desirable or necessary. By means of the above device the protector sleeve may be secured to a tire of any ordinary construction or form in such a manner as to make its retention certain, and yet the construction of the protector is such that the resiliency of the tire is not impaired, and in case the tire should become deflated the parts are so constructed and assembled that no part of the protector can become detached when in use, and the materials of the several parts of the protector may be varied according to the option of the manufacturer or user and in accordance with the circumstances to be met.

When the hereindescribed novel securing means are used in connection with a sleeve having rows of eyelets along its margins as indicated in Fig. 9, it is preferable to secure the hooks 15 permanently to the plates 16 in substantially the same manner as above described in connection with the sleeve 10. Each hook being secured in either case by first passing end 15$^a$ through the part to which it is to be attached and then bending it by any suitable means snugly against the shank of the hook. As indicated in Figs. 9—10, after the hooks are attached to the plates 16 opposite ends of the hooks are inserted through the eyelets 20$^a$. Securing means employed in this modification are or may be precisely the same as those employed in the form first described.

Having thus described the invention what is claimed as new is:

1. A tire protector comprising a flexible sleeve portion having series of holes along its margins, draft hooks adapted to engage in said holes, plates of substantially the same curvature as the wheel rim and having two sets of holes, threaded bolts adapted to engage in one set of plate holes, the other set of which engage the hooks aforesaid, one or more yokes having threaded ends and adapted to embrace the wheel felly, and threaded means to adjustably secure said bolts to the yoke ends and the protector to the tire.

2. In a tire protector, the combination of a flexible sleeve portion provided with a reinforcement strip and armor plates secured thereto by rivets, said sleeve being provided with series of marginal holes, rigid yokes adapted to embrace the felly and extend on opposite sides thereof toward the sleeve margins, devices interengaged with the holes of the sleeve, and means including turnbuckles for securing said devices to the yokes.

3. A device for securing a protector sleeve to a wheel comprising a plurality of double-ended hooks adapted to be connected at one end with the said sleeve, rigid plates connected with the other end of the said hooks and having slot holes, T-headed bolts secured in the said slot holes, and means embracing the wheel felly and adjustably connected with the said bolts.

4. The combination of a sleeve provided with series of marginal holes, rigid plates curved to conform to the curvature of the wheel rim and having series of holes spaced the same distance apart as the sleeve holes, means secured to said plates and embracing the wheel felly, and sets of double-ended hooks securing said plates to the sleeve, one end of the said hooks interengaged with the sleeve holes and the other end with plate holes, one end of each hook being adapted to be forced snugly against the shank thereof whereby the hook is permanently secured to the part embraced thereby.

5. Means for securing a protector sleeve to a wheel comprising rigid plates provided with slot holes, bolts having curved ends terminating in T-heads which interlock with said slot holes, and means embracing the wheel rim and adjustably connected with the said bolts.

6. In a tire protector, the combination of a flexible sleeve, a plurality of rigid plates curved to conform substantially to the curvature of a wheel rim, means to detachably secure the said plates to the said sleeve, yokes to embrace the wheel felly, and means to detachably and adjustably secure said yokes to said curved plates, substantially as set forth.

In testimony whereof I affix my signature in presence of two witnesses.

SAMUEL C. WOLFE.

Witnesses:
THOMAS B. FREEMAN,
ALPHONSO C. WOOD.